(12) United States Patent
Plotke et al.

(10) Patent No.: US 7,134,630 B2
(45) Date of Patent: Nov. 14, 2006

(54) THERMAL DEFORMATION DETERMINATION FOR PAYLOAD POINTING USING SPACE-BASED BEACON

(75) Inventors: Leonard A. Plotke, Los Angeles, CA (US); Ketao Liu, Cerritos, CA (US)

(73) Assignee: The Boeing Company, Chicago, IL (US)

( * ) Notice: Subject to any disclaimer, the term of this patent is extended or adjusted under 35 U.S.C. 154(b) by 117 days.

(21) Appl. No.: 10/929,844

(22) Filed: Aug. 30, 2004

(65) Prior Publication Data

US 2006/0054745 A1    Mar. 16, 2006

(51) Int. Cl.
*B64G 1/36* (2006.01)
(52) U.S. Cl. .................. 244/171; 244/171.8; 244/171.3
(58) Field of Classification Search .................. 43/171, 43/164, 171.8, 173.1
See application file for complete search history.

(56) References Cited

U.S. PATENT DOCUMENTS

| | | | |
|---|---|---|---|
| 4,883,244 A | 11/1989 | Challoner et al. | |
| 5,187,805 A | 2/1993 | Bertiger et al. | |
| 5,267,167 A * | 11/1993 | Glickman | 701/226 |
| 6,142,423 A * | 11/2000 | Wehner | 244/164 |
| 6,195,044 B1 | 2/2001 | Fowell | |
| 6,216,983 B1 * | 4/2001 | Wehner et al. | 244/164 |

* cited by examiner

*Primary Examiner*—Timothy D. Collins
(74) *Attorney, Agent, or Firm*—Jonathan W. Hallman; MacPherson Kwok Chen & Heid LLP

(57) ABSTRACT

A system and associated method for compensating for thermal deformation of a spaced-based structure having a spacecraft payload. The system including a beacon source coupled to a first spacecraft for transmitting a first signal and a beacon sensor coupled to a second spacecraft for receiving the first signal and providing measurement data derived from the first signal. At least one attitude sensing device is coupled to the second spacecraft for determining estimated spacecraft attitude data for the second spacecraft. A processor on the second spacecraft is configured to process ephemeris data of the first and second spacecraft, beacon measurement data, estimated spacecraft attitude data, and gimbal angular position data to estimate spacecraft structural deformation.

11 Claims, 4 Drawing Sheets

THERMAL DEFORMATION DETERMINATION FOR PAYLOAD POINTING USING SPACE-BASED BEACON

TECHNICAL FIELD

The present invention relates generally to spacecraft attitude determination and control systems, and more specifically to a method and system for determining spacecraft structural thermal deformation using a space-based beacon for accurate spacecraft pointing.

BACKGROUND

Inaccurate pointing of a spacecraft payload can significantly reduce spacecraft effectiveness. For example, inaccurate pointing of a communication antenna can significantly reduce spacecraft communication throughput as well as reduce the communication coverage.

Structural thermal deformation is always a major error contributor to spacecraft payload pointing. Accordingly, to achieve high pointing accuracy, the amount of spacecraft structural thermal deformation needs to be accurately determined and compensated.

As a result, there is a need for achieving high pointing accuracy of a spacecraft by accurately accounting for spacecraft structural thermal deformation.

SUMMARY

A method is disclosed herein for achieving payload pointing accuracy of a spacecraft, such as a communications satellite. The pointing accuracy is achieved by accurately accounting for spacecraft structural thermal deformation. This accuracy is determined by using a spaced-based beacon from another spacecraft. This spaced-based beacon may be a beacon dedicated for use in the present invention. Alternatively, the beacon may have other uses such an RF cross-links or laser cross-links of the two spacecraft.

In one aspect of the invention, a method of determining structural thermal deformation is provided. The method includes the acts of: method of determining structural thermal deformation comprising: determining ephemeris of a first spacecraft and a second spacecraft; receiving a beacon from the second spacecraft at a beacon sensor co-located with a payload of the first spacecraft; determining the direction of the received beacon with respect to the attitude of the first spacecraft; determining the attitude of the first spacecraft using at least one attitude sensor; and calculating a structural thermal deformation between the at least one attitude sensor and the payload using the ephemeris of the first and second spacecraft, the direction of the received beacon, and the attitude of the first spacecraft.

In another aspect of the present invention, a spacecraft operable to measure structural thermal deformation between a payload and at least one attitude sensor configured to determine an attitude of the spacecraft is provided. The spacecraft includes: a beacon sensor co-located with the payload; and a processor configured to calculate the structural thermal deformation between the at least one attitude sensor and the payload using an ephemeris of the first and second spacecraft, a direction of the received beacon with respect to the beacon sensor, and the attitude of the spacecraft.

In another aspect of the invention, a satellite system is provided. The system includes: a beacon source in a first Earth orbiting spacecraft; a beacon sensor in a second Earth orbiting spacecraft to receive the beacon from the beacon source, the beacon sensor being co-located with a gimbal-mounted payload; means for determining a first direction vector for the received beacon in a spacecraft frame of reference that does not include thermal deformation and for determining a second direction vector for the received beacon that does include thermal deformation; and means for determining thermal deformation angles that are used to correct for the thermal deformation based upon the first and second direction vectors.

Beneficially, the present invention enables precision attitude control system design that does not rely on any ground-based beacons. This feature is advantageous because a ground-based beacon is not always available for various reasons. In addition, certain spacecraft payloads such as RF and laser cross-link antennas may not be Earth pointed and require space based beacons for pointing references.

By accurately determining structural thermal deformation, the present invention enables the reduction of spacecraft payload pointing error by two to three times.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
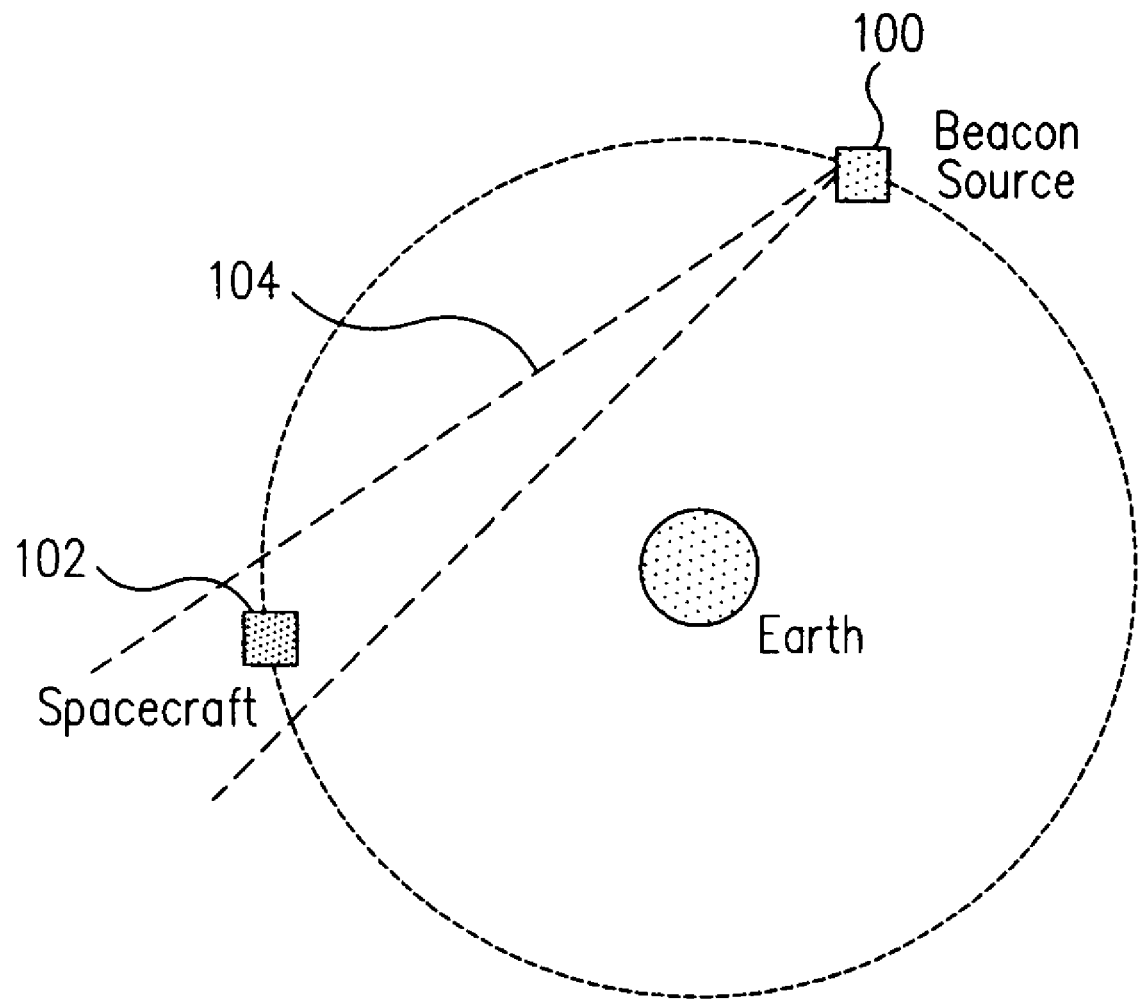
FIG. 1 illustrates a beacon transmitting spacecraft and a beacon receiving spacecraft in orbit around the Earth.

This invention provides a solution for spacecraft structural thermal deformation determination using a space-based beacon to improve spacecraft pointing error. Turning now to the FIGS., a first spacecraft 100 and a second spacecraft 102 are shown in orbit in FIG. 1. First spacecraft 100 and second spacecraft 102 can be any type of spacecraft that are capable of being placed in Earth orbiting orbits. As will be described further herein, second spacecraft 102 may correct for thermal deformation that affects pointing of a payload in a specific direction by processing a beacon signal 104 received from first spacecraft 100. First spacecraft 100 and second spacecraft 102 may be, for example, communications satellites with Earth pointing antennas or cross-link antennas, which need to be pointed accurately. The first spacecraft 100 may be a spacecraft that carries only beacon sources, such as a GPS spacecraft.

Figure 2:
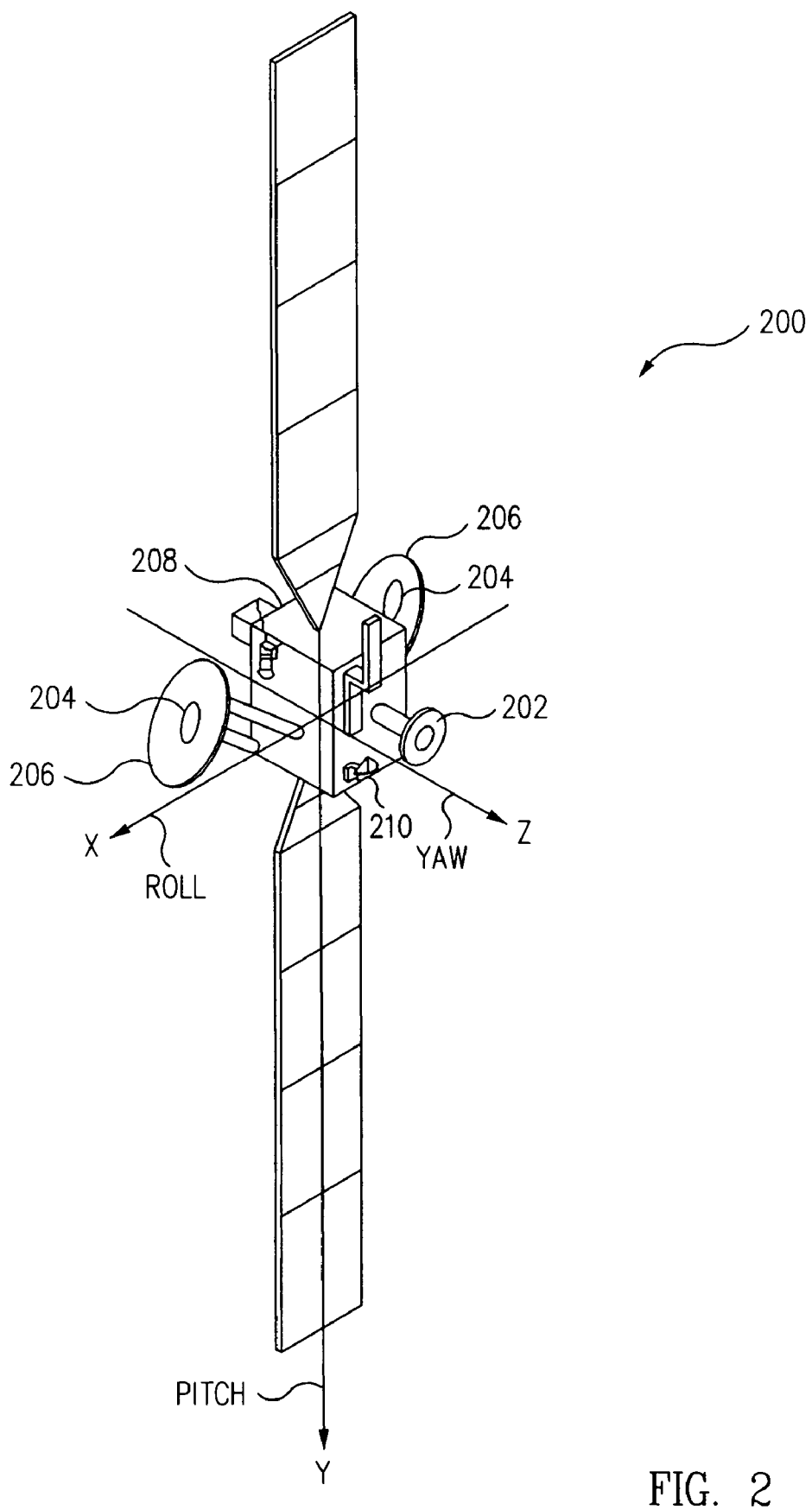
FIG. 2 is a simplified illustration of the beacon receiving spacecraft in accordance with the present invention.

FIG. 2 is a simplified view of an exemplary spacecraft 200, which represents an embodiment of either first spacecraft 100 or second spacecraft 102. Should spacecraft 200 represent an embodiment of first spacecraft 100, it will include a beacon source 202. Beacon source 202 transmits beacon signal 104, which can be received by second spacecraft 102 (see FIG. 1). Beacon source 202 in spacecraft 200 can be a dedicated signal source specifically used to assist the pointing of the spacecraft. Alternatively, beacon source 202 can be an RF or laser crosslink that is used to establish a communication link between spacecrafts.

Alternatively, should spacecraft 200 represent an embodiment of second spacecraft 102, it will include a beacon sensor 204, a spacecraft payload 206, a processor disposed in spacecraft bus 208, and at least one attitude sensor 210, such as a star tracker. Beacon sensor 204 may be co-located with spacecraft payload 206, or alternatively, beacon sensor 204 may not be required if, for example, spacecraft payload 206 provides the same functionality as beacon sensor 204.

Spacecraft payload 206 may be any payload that requires precise pointing, such as a phased array antenna, a laser communication terminal, and the like. Spacecraft payload 206 is mechanically coupled to spacecraft 200 and is therefore subject to perturbations caused by the thermal deformation of the structural components of spacecraft 200, even though star tracker 210 mounted on spacecraft bus 208 can provide accurate pointing of spacecraft bus 208. It is the structural perturbations between star tracker 210 and spacecraft payload 206 that may cause the pointing accuracy of spacecraft payload 206 to be degraded. The pointing (orientation) of spacecraft payload 206 may be steered by mechanical gimbals. Alternatively, payload 206 may be fixed with respect to spacecraft bus 208.

As will be explained further herein, the accounting for the structural perturbations causing pointing accuracy degradation for payload 206 uses ephemeris of first spacecraft 100 and second spacecraft 102. Ephemeris of first spacecraft 100 and second spacecraft 102 can be uploaded from ground to second spacecraft 102. Alternatively, ephemeris of first spacecraft 100 can be computed by a processor located on-board second spacecraft 102. In addition to the ephemeris just described, the pointing attitude of the second spacecraft 102 as measured by the one to a plurality of attitude sensors 210, such as star trackers and the like, and also the pointing angle of the received beacon 104 with respect to payload 106 are also used to determine the structural thermal deformation. Given the ephemeris of first spacecraft 100 and second spacecraft 102, the pointing angle of received beacon signal 104 with respect to payload 106, and the estimated attitude of second spacecraft 102, the processor on second spacecraft 102 computes direction vectors of beacon signal 104.

As described in detail below, the direction vectors are computed in two representative coordinate frames. The first frame is defined prior to structural thermal deformation. The second frame is defined by including the deformation. In accordance with the present invention, the two direction vectors are used to determine the thermal deformation between star tracker 210 and spacecraft payload 206. Quantifying the thermal deformation in this manner makes it possible to account for and compensate for pointing errors caused by the thermal deformation. The determination of the direction vectors will now be further explained as follows.

A) Direction Vector Determination

Figure 3:
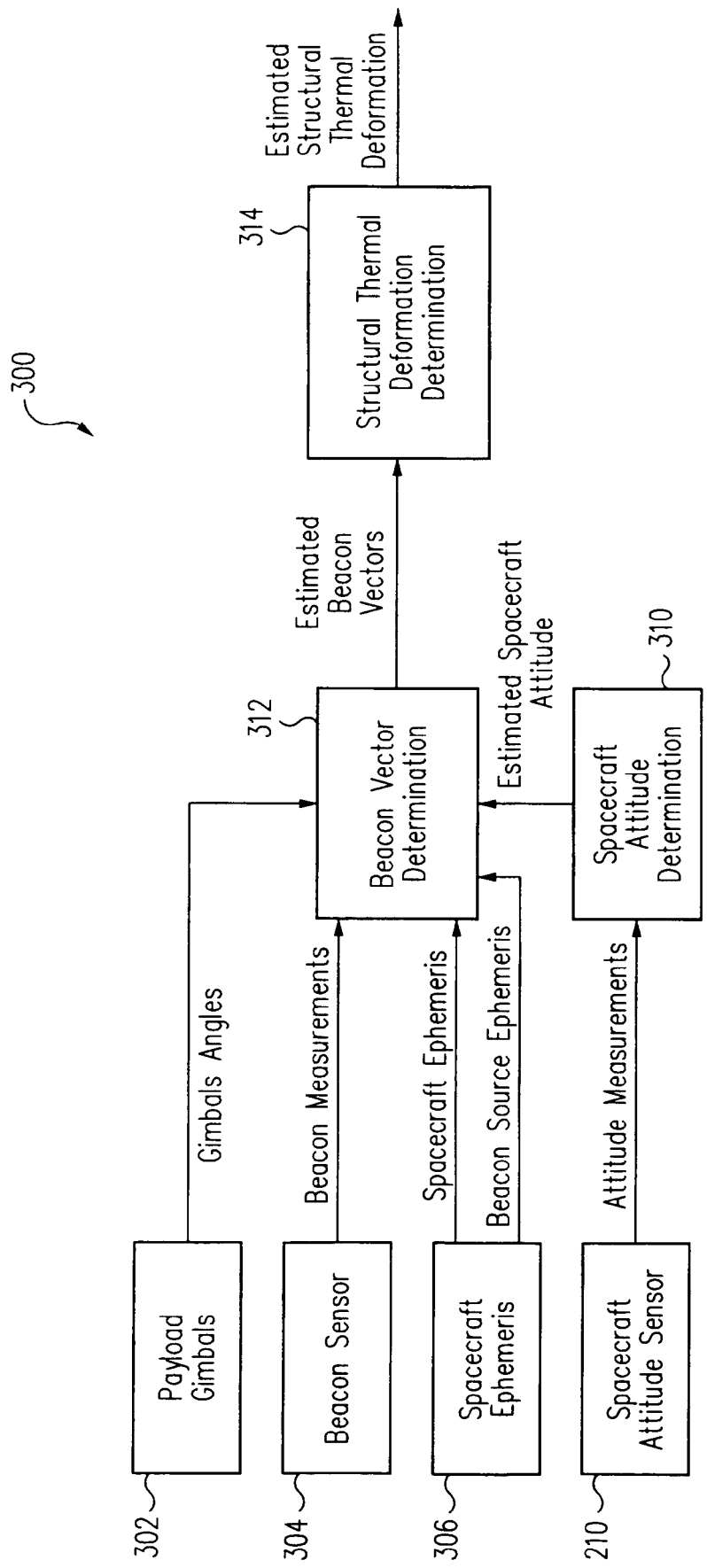
FIG. 3 is a computational diagram for a calculation of thermal deformation for the beacon receiving spacecraft in accordance with an embodiment of the present invention.

The calculation of the direction vectors for received beacon 104 may be better understood with reference to a computational diagram shown in FIG. 3. A direction vector determination 312 for the received beacon 104 depends, in part, upon spacecraft attitude estimates from a spacecraft attitude determination 310 based upon measurements made by the at least one attitude sensor 210. Direction vector determination also depends upon spacecraft ephemeris 306 that includes the ephemeris for the source of beacon 104 at spacecraft 100 and the ephemeris for spacecraft 102. In addition, direction vector determination also depends upon the pointing angle for received beacon 104. In embodiments wherein payload 206 (and hence beacon sensor 204) mounts to spacecraft 102 through payload gimbals 302, the pointing angle for the received beacon 104 will depend upon payload gimbal angles. In addition, the pointing angle will also depend upon beacon sensor measurements 304.

Upon processing this information, it may be shown that the unit beacon vector in inertial reference frame is given as follows:

$$^i\hat{u}_{beacon} = \frac{^i\hat{v}_{SC\_beacon} - ^i\hat{v}_{SC\_sensor}}{|^i\hat{v}_{SC\_beacon} - ^i\hat{v}_{SC\_sensor}|}$$

where $^i\hat{v}_{SC\_sensor}$ is the position vector of beacon sensor 204 in the inertial frame of reference as computed from spacecraft ephemeris for spacecraft 102, and $^i\hat{v}_{SC\_beacon}$ is the position vector of first spacecraft 100 (and hence the position vector for the source of beacon 104) in the inertial frame of reference as computed from spacecraft ephemeris for first spacecraft 100.

It will be appreciated by those of ordinary skill that what is ultimately desired to be determined is the impact of thermal structural deformation on the orientation of payload 206. This impact may be defined with respect to roll ($\theta_x$), pitch ($\theta_y$) and yaw ($\theta_z$) angles with respect to the spacecraft frame of reference as shown in FIG. 2. These angles form a vector $\hat{\theta}_{DEF}$. The gimbal angles for payload 206 may then be adjusted accordingly to correct for this thermal deformation effect as represented by vector $\hat{\theta}_{DEF}$. Alternatively, the orientation of spacecraft 102 may be adjusted should payload 106 be rigidly mounted to spacecraft 102 without the use of gimbals.

To derive $\hat{\theta}_{DEF}$ from $^i\hat{u}_{beacon}$, it may be shown that these two variables are related as follows:

$$^i\hat{u}_{beacon} = C_{SC\_i}(q_{SC})^T C_{SCDEF\_SC}(\hat{\theta}_{DEF})^T C_{sensorGIM\_SCDEF}(\hat{\theta}_{ALIGN})^T C_{sensorLOS\_sensorGIM}(\hat{\theta}_{sensorGIM})^{T\,sensor}\_LOS \hat{u}_{beacon}$$

where $C_{SC\_i}(q_{SC})$ is the direction cosine matrix from inertial frame to spacecraft frame, $q_{SC}$ is the quoterion of spacecraft attitude in inertial frame that is determined by spacecraft attitude determination, $C_{SCDEF\_SC}(\hat{\theta}_{DEF})$ is the direction cosine matrix from spacecraft frame to the frame after structural deformation, $$\hat{\theta}_{DEF} = \begin{bmatrix} \theta_x \\ \theta_y \\ \theta_z \end{bmatrix}$$

is the angular vector as just described, $C_{sensorGIM\_SCDEF}(\hat{\theta}_{ALIGN})$ is the alignment direction cosine matrix of beacon sensor gimbals, $\hat{\theta}_{ALIGN}$ is the known alignment angular vector, $C_{sensorLOS\_sensorGIM}(\hat{\theta}_{sensorGIM})$ is the direction cosine matrix from sensor gimbals base frame to sensor LOS frame, $\hat{\theta}_{sensorGIM}$ is the gimbals axes rotation vector that is known or is measured by gimbals control subsystem, and $^{sensorLOS}\hat{u}_{beacon}$ is the unit beacon vector in sensor LOS frame that is measured by beacon sensor 204.

To solve for $\hat{\theta}_{DEF}$, the preceding expression for $^i\hat{u}_{beacon}$ may be rewritten as follows:

$$\begin{bmatrix} 1 & \theta_z & -\theta_y \\ -\theta_z & 1 & \theta_x \\ \theta_y & -\theta_x & 1 \end{bmatrix} {}^{SC}\hat{u}_{beacon} = {}^{SCDEF}\hat{u}_{beacon} \quad \text{Equation (1)}$$

where ${}^{SC}\hat{u}_{beacon}$ is the unit direction vector for the beacon in the spacecraft 102 frame of reference without thermal deformation, and ${}^{SCDEF}\hat{u}_{beacon}$ is the unit direction vector for the beacon in the spacecraft 102 frame of reference with thermal deformation. The vector ${}^{SC}\hat{u}_{beacon}$ is related to the ${}^{i}\hat{u}_{beacon}$ vector by the following relationship:

$$ {}^{SC}\hat{u}_{beacon} = C_{SC\_i}(q_{SC}) {}^{i}\hat{u}_{beacon} = \begin{bmatrix} a_1 \\ a_2 \\ a_3 \end{bmatrix} $$

whereas the vector ${}^{SCDEF}\hat{u}_{beacon}$ may be determined from the following expression:

$$ {}^{SCDEF}\hat{u}_{beacon} = C_{sensorGIM\_SCDEF}(\hat{\theta}_{ALIGN})^T C_{sensorLOS\_sensorGIM}(\hat{\theta}_{sensorGIM}) {}^{TsensorLOS}\hat{u}_{beacon} = \begin{bmatrix} b_1 \\ b_2 \\ b_3 \end{bmatrix} $$

where the variables are defined as discussed above. Using these expressions for vectors ${}^{SCDEF}\hat{u}_{beacon}$ and ${}^{SC}\hat{u}_{beacon}$, equation (1) may be rewritten as:

$$\begin{bmatrix} 0 & -a_3 & a_2 \\ a_3 & 0 & -a_1 \\ -a_2 & a_1 & 0 \end{bmatrix} \begin{bmatrix} \theta_x \\ \theta_y \\ \theta_z \end{bmatrix} = \begin{bmatrix} b_1 - a_1 \\ b_2 - a_2 \\ b_3 - a_3 \end{bmatrix} = \begin{bmatrix} m_1 \\ m_2 \\ m_3 \end{bmatrix} \quad \text{Equation (2)}$$

Equation (2) is the measurement equation of structural thermal deformation. As set forth above, the parameters of this equation are computed from gimbals alignment angles and gimbals axes angles (302), beacon sensor measurements (304), spacecraft positions of first spacecraft 100 and second spacecraft 102 from their respective ephemeris (306), and spacecraft attitude estimates (310). Equation (2) may be simplified to:

$$H\theta_{DEF} = M \text{ where} \quad \text{Equation (3)}$$

$$H = \begin{bmatrix} 0 & -a_3 & a_2 \\ a_3 & 0 & -a_1 \\ -a_2 & a_1 & 0 \end{bmatrix}, \quad M = \begin{bmatrix} m_1 \\ m_2 \\ m_3 \end{bmatrix}.$$

By solving Equation (3) for the variable $\theta_{DEF}$, the effect of structural thermal deformation of second spacecraft 102 between attitude sensor 210 and beacon sensor 204 (and therefore the spacecraft payload 206) can be determined.

B) Thermal Deformation Update Equation

It will be appreciated that to continuously receive beacon signal 104 may be impossible due to the fact that the payload pointing angle is not fixed and may be steered away from the beacon source from time to time. However, due to regular heating of a geosynchronous satellite by the sun, the thermal deformation is predictable and repeatable over a 24-hour period. Accordingly, the structural thermal deformation of the second spacecraft 102 over time may be modeled and predicted, using, for example, harmonic analysis. The model may be updated based upon periodic updates. Alternatively, the model may be updated using non-periodic updates.

For example, due to the periodic nature of the spacecraft thermal environment in Earth orbit, structural thermal deformation over time can be decomposed into harmonic components in a harmonic equation as follows:

$$\begin{bmatrix} x_{1\_s}(k+1) \\ x_{1\_c}(k+1) \\ \vdots \\ x_{1\_s}(k+1) \\ x_{N\_c}(k+1) \\ y_{1\_s}(k+1) \\ y_{1\_c}(k+1) \\ \vdots \\ y_{N\_s}(k+1) \\ y_{N\_c}(k+1) \\ z_{1\_s}(k+1) \\ z_{1\_c}(k+1) \\ \vdots \\ z_{N\_s}(k+1) \\ z_{N\_c}(k+1) \end{bmatrix} = \begin{bmatrix} c_{\omega_1} & s_{\omega_1} & & & & & & & & & \\ -s_{\omega_1} & s_{\omega_1} & & & & & & & & & \\ & & \ddots & & & & & & & & \\ & & & c_{\omega_s} & s_{\omega_s} & & & & & & \\ & & & -s_{\omega_s} & c_{\omega_s} & & & & & & \\ & & & & & c_{\omega_1} & s_{\omega_1} & & & & \\ & & & & & -s_{\omega_1} & c_{\omega_1} & & & & \\ & & & & & & & \ddots & & & \\ & & & & & & & & c_{\omega_s} & s_{\omega_s} & \\ & & & & & & & & -s_{\omega_s} & c_{\omega_s} & \\ & & & & & & & & & & c_{\omega_1} & s_{\omega_1} \\ & & & & & & & & & & -s_{\omega_1} & c_{\omega_1} \\ & & & & & & & & & & & & \ddots \\ & & & & & & & & & & & & & c_{\omega_s} & s_{\omega_s} \\ & & & & & & & & & & & & & -s_{\omega_s} & c_{\omega_s} \end{bmatrix} \begin{bmatrix} x_{1\_s}(k) \\ x_{1\_c}(k) \\ \vdots \\ x_{N\_s}(k) \\ x_{N\_c}(k) \\ y_{1\_s}(k) \\ y_{1\_c}(k) \\ \vdots \\ y_{N\_s}(k) \\ y_{N\_c}(k) \\ z_{1\_s}(k) \\ z_{1\_c}(k) \\ \vdots \\ z_{N\_s}(k) \\ z_{N\_c}(k) \end{bmatrix}$$

where $c_{\omega_i}=\cos \omega_i \Delta t$, $s_{\omega_i}=\sin \omega_i \Delta t$ are the sine and cosine functions of the $i^{th}$ harmonic frequency of the spacecraft orbit period, and $x_{i\_s}$, $x_{i\_c}$, $y_{i\_s}$, $y_{i\_c}$, $z_{i\_s}$, $z_{i\_c}$ thermal deformation in x-, y-, z-axes as shown in FIG. 2. In this example, the indices k and k+1 represent arbitrary periodic sampling times separated by the sampling period. It will be appreciated, however, that this harmonic analysis may be generalized for non-periodic updates.

Therefore, the structural thermal deformation determination update equation can be represented by:

$$\begin{bmatrix} \theta_x(k) \\ \theta_y(k) \\ \theta_z(k) \end{bmatrix} = \begin{bmatrix} 1 & 1 & \cdots & 1 & 1 & & & & & & & & \\ & & & & & 1 & 1 & \cdots & 1 & 1 & & & \\ & & & & & & & & & & 1 & 1 & \cdots & 1 & 1 \end{bmatrix} \begin{bmatrix} x_{1\_s}(k) \\ x_{1\_c}(k) \\ \vdots \\ x_{N\_s}(k) \\ x_{N\_c}(k) \\ y_{1\_s}(k) \\ y_{1\_c}(k) \\ \vdots \\ y_{N\_s}(k) \\ y_{N\_c}(k) \\ z_{1\_s}(k) \\ z_{1\_c}(k) \\ \vdots \\ z_{N\_s}(k) \\ z_{N\_c}(k) \end{bmatrix}$$

The harmonic equation and thermal deformation update equation can be written in the following simplified matrix and vector forms:

$$V_{k+1} = A V_k$$

$$\theta_{DEF\_k} = C V_k$$

C) Thermal Deformation Estimation Equations

Figure 4:
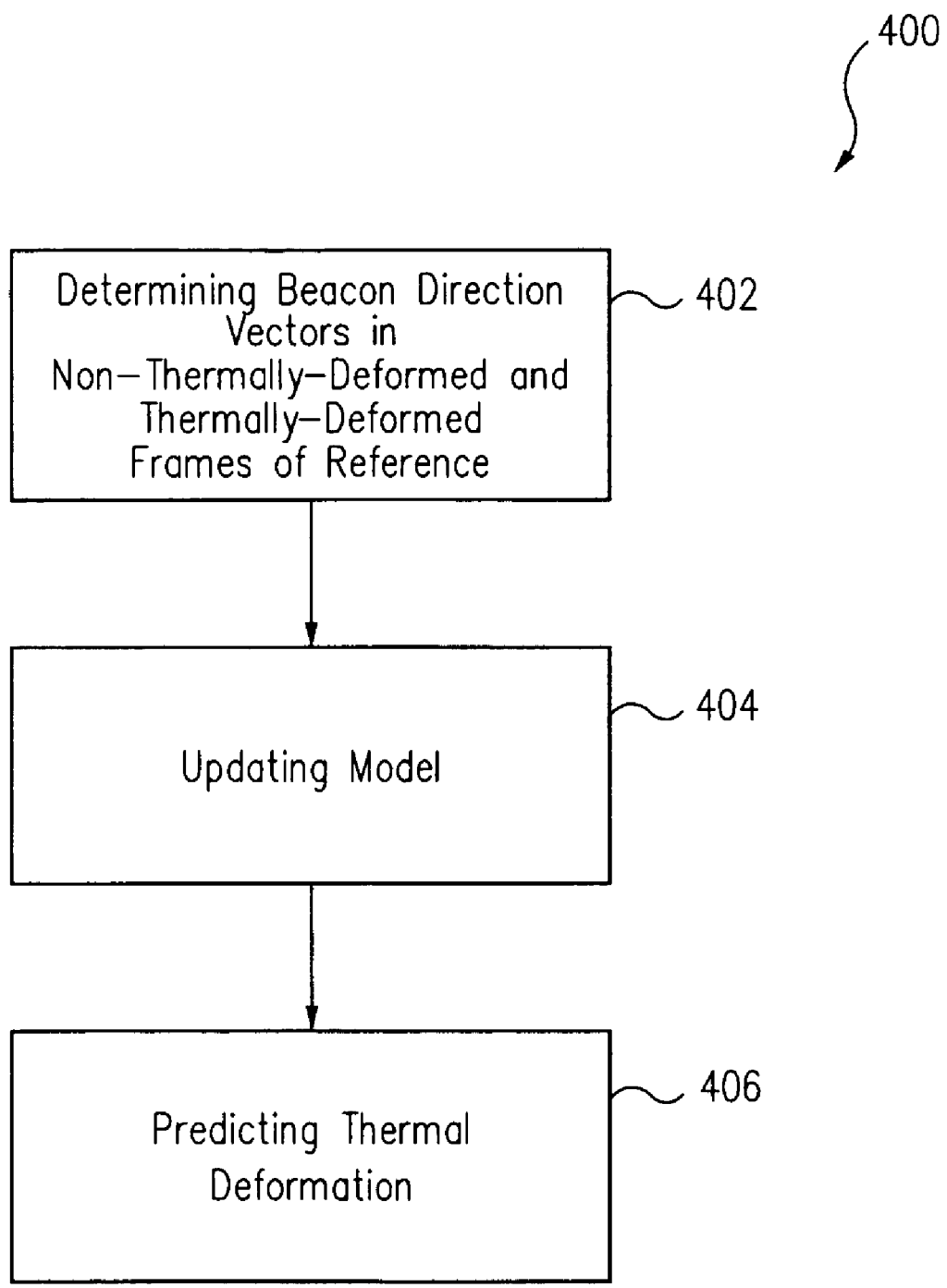
FIG. 4 is a flowchart for a calculation of thermal deformation for the beacon receiving spacecraft in accordance with an embodiment of the present invention.

Combining Equation (3) with the preceding harmonic and thermal update equations yields the following estimation equations to determine structural thermal deformation (s406):

$$\hat{V}_{k+1} = A\hat{V}_k + G(M_k - H_k C \hat{V}_k)$$

$$\hat{\theta}_{DEF\_k} = C \hat{V}_k$$

where G is the estimation gain matrix. The thermal deformation calculation and model update process may be summarized with respect to a flowchart 400 shown in FIG. 4.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A first spacecraft operable to measure structural thermal deformation between a payload and at least one attitude sensor configured to determine an attitude of the first spacecraft, comprising:
    a beacon sensor co-located with the payload, the beacon sensor being operable to measure a direction for a received beacon transmitted from a second spacecraft; and
    a processor configured to calculate the structural thermal deformation between the at least one attitude sensor and the payload using an ephemeris of the first and second spacecraft, the direction of the received beacon, and the first spacecraft attitude.

2. The first spacecraft of claim 1, wherein the payload comprises a phased array antenna.

3. The first spacecraft of claim 1, wherein the payload comprises a laser.

4. The first spacecraft of claim 1, wherein the payload mounts to a gimbaled platform, the first spacecraft further comprising at least one payload gimbal position sensor to provide gimbal angular position data.

5. The spacecraft of claim 1, wherein the beacon sensor comprises the payload.

6. The first spacecraft of claim 1, wherein the at least one attitude sensor comprises a star tracker.

7. The first spacecraft of claim 1, wherein the beacon sensor comprises an antenna.

8. The first spacecraft of claim 1, wherein the beacon sensor comprises a laser sensor.

9. A satellite system configuration comprising:
    a beacon source in a first Earth orbiting spacecraft;
    a beacon sensor in a second Earth orbiting spacecraft to receive the beacon from the beacon source, the beacon sensor being co-located with a gimbal-mounted payload;
    means for determining a first direction vector for the received beacon in a spacecraft frame of reference that does not include thermal deformation and for determining a second direction vector for the received beacon that does include thermal deformation; and
    means for determining thermal deformation angles that are used to correct for the thermal deformation based upon the first and second direction vectors.

10. The system of claim 9, wherein the beacon sensor comprises the gimbal-mounted payload.

11. The system of claim 9, wherein the beacon source is a laser source.

* * * * *